United States Patent [19]

Jabbari

[11] Patent Number: 5,341,260
[45] Date of Patent: Aug. 23, 1994

[54] REDUCED TORQUE UNLOADING RAMP SYSTEM FOR A HARD DISK DRIVE

[75] Inventor: Irai Jabbari, San Jose, Calif.

[73] Assignee: Seagate Technology, Inc., Scotts Valley, Calif.

[21] Appl. No.: 985,987

[22] Filed: Dec. 4, 1992

[51] Int. Cl.⁵ .................... G11B 5/54; G11B 21/22
[52] U.S. Cl. .................................................. 360/105
[58] Field of Search ....................... 360/104–106, 360/109

[56] References Cited

U.S. PATENT DOCUMENTS

| | | | |
|---|---|---|---|
| 4,535,374 | 8/1985 | Anderson et al. | 360/103 |
| 4,864,437 | 9/1989 | Couse et al. | 360/75 |
| 4,933,785 | 6/1990 | Morehouse et al. | 360/105 |
| 5,027,241 | 6/1991 | Hatch et al. | 360/104 |
| 5,148,339 | 9/1992 | Yoshida | 360/105 |

*Primary Examiner*—John H. Wolff
*Assistant Examiner*—David D. Davis
*Attorney, Agent, or Firm*—Flehr, Hohbach, Test, Albritton & Herbert

[57] ABSTRACT

A disk drive including a plurality of read/write heads mounted on flexures which move the heads into cooperative arrangements with the data tracks is disclosed. In order to keep the heads from landing on the disk when power is removed from the disk drive, a number of head support ramps, one cooperating with each flexure, are provided adjacent the outside diameter of the disk or disks. The location of the head ramps is staggered, around the circumference of the disk, so that the head support flexures contact the ramps in successive time intervals. Less power is needed to overcome the friction of each flexure against the ramp and move the flexure up the ramp to park the head safely above the surface of the disk.

9 Claims, 5 Drawing Sheets

TORQUE REQUIRED TO UNLOAD THE HEADS
————— COEFF. OF FRICTION —————

| Ramp Angle | u=.20 oz-in | N-M | u=.15 oz-in | N-M | u=.10 oz-in | N-M | u=.05 oz-in | N-M |
|---|---|---|---|---|---|---|---|---|
| 8.5 STD | 0.462 | 0.0033 | 0.393 | 0.0028 | 0.324 | 0.0023 | 0.257 | 0.0018 |
| TIMED | 0.359 | 0.0025 | 0.292 | 0.0021 | 0.266 | 0.0016 | 0.161 | 0.0011 |
| 7.5 STD | 0.436 | 0.0031 | 0.368 | 0.0026 | 0.301 | 0.0021 | 0.234 | 0.0017 |
| TIMED | 0.346 | 0.0024 | 0.280 | 0.0020 | 0.214 | 0.0015 | 0.149 | 0.0011 |
| 6.5 STD | 0.412 | 0.0029 | 0.344 | 0.0024 | 0.277 | 0.0020 | 0.211 | 0.0015 |
| TIMED | 0.334 | 0.0024 | 0.268 | 0.0019 | 0.203 | 0.0014 | 0.136 | 0.0010 |
| 5.5 STD | 0.387 | 0.0027 | 0.320 | 0.0023 | 0.254 | 0.0018 | 0.188 | 0.0013 |
| TIMED | 0.332 | 0.0023 | 0.256 | 0.0018 | 0.191 | 0.0013 | 0.126 | 0.0009 |

FIG. 6

2% REDUCTION IN TORQUE WHEN TIMED RAMP IS USED
————— COEFF. OF FRICTION —————

| | | 0.20 | 0.15 | 0.10 | 0.05 |
|---|---|---|---|---|---|
| RAMP ANGLE | 8.5 | 22% | 26% | 30% | 37% |
| | 7.5 | 21% | 24% | 29% | 36% |
| | 6.5 | 19% | 22% | 27% | 35% |
| | 5.5 | 17% | 20% | 25% | 33% |

FIG. 7

REDUCED TORQUE UNLOADING RAMP SYSTEM FOR A HARD DISK DRIVE

FIELD OF THE INVENTION

This invention relates to the field of rigid disk drive data storage devices and more particularly to an improved method and apparatus for unloading the read/write heads from engagement with the disks at power loss. It is most useful in disk drives of the so-called 2½ inch form factor which have recently become the standard mass data storage devices for laptop and notebook personal computers.

BACKGROUND OF THE INVENTION

Since the release of the first hard disk drives incorporating "Winchester" technology, there has been an awareness in the industry of potential problems associated with head/media contact during power on/power off conditions. These problems generally relate to the possibility of friction-induced wear of the read/write heads or the recording medium during those intervals of time before the "air bearing" on which the read/write heads "fly" has become established during spin-up of the disks, and after the "air bearing" has deteriorated during spin-down.

Through the intervening years, many schemes have evolved to minimize the risks associated with "contact start/stop":

1. In disk drives incorporating stepper motors to move the read/write heads across the disk surface, the heads have frequently been allowed to land on the disk surface wherever they happened to be when power was removed. The detent of the stepper motor was then sufficient to "latch" the heads in this position until power was once again restored to the drive.

Philosophically, this approach relied on the random nature of the landing location to prevent head/media wear from building up to a catastrophic level. This is by far the simplest scheme to implement.

Several problems, however, are implicit in this approach:

a) Since the heads land over data on the disk surface, any fatal damage caused by head/disk contact will result in loss of stored data;

b) Any damage to the read/write head caused by head/disk contact will render the head incapable of reading or writing to any area on the associated disk surface;

c) When "Voice Coil Motors" (VCMs) are used to move the heads, there is no detent to prevent movement of the heads while they are in contact with the disk surface when power is removed. Clearly, any relative motion of the heads and disks while they are in direct contact should be avoided.

2. The next simplest approach is to create a "dedicated parking zone" to which the heads are moved at all power losses. This scheme is typically achieved using the back-EMF of the motor which spins the disk, or spindle motor, and is very simple to implement in VCM drives, since a simple DC current applied to the voice coil will move the heads to the inner or outer extreme of their range of motion. A method of using the back-EMF of the spindle motor to drive a stepper motor to the dedicated landing zone has been disclosed in U.S. Pat. No. 4,679,102, issued Jul. 7, 1987, assigned to the assignee of the present invention and incorporated herein by reference.

The parking zone is usually located adjacent the inner diameter of the disk surface to minimize the starting torque requirement of the spindle motor.

The dedicated parking zone typically does not contain user data, and so this approach overcomes the problem stated in 1.a) above.

However, since all starts and stops will occur in the same location using this method, the likelihood of catastrophic failure during the life of the drive is greatly increased.

Further, VCM drives using this method require the addition of a mechanical latch to hold the heads in the dedicated parking zone. Such a mechanical latch adds to the cost and complexity of the drive design.

As stated above, this approach relies on the back-EMF of the spindle motor being of sufficient size and duration to accomplish the parking maneuver.

3. Ramp Loading/Unloading of the read/write heads represents the third solution to the problem of contact start/stop, and is actually a reversion to previous technology, wherein the heads are physically removed from association with the disks at power down, and brought back into association with the disks at power up only after the disks have been spun up to full operational speed.

This approach includes the provision of some form of "ramping" mechanism adjacent the outer diameter of the disk which acts cooperatively with the load beam/gimbal assembly carrying the read/write head to mechanically lift the read/write head off the air bearing on which it flies when the head-moving actuator moves the read/write heads outward past the outermost data area Of the disk. An example of this type of mechanism is shown in U.S. Pat. No. 4,535,374, issued Aug. 13, 1985 (Amcodyne).

Again, in most cases the power to move the read/write heads to and onto the ramps is derived from the back-EMF of the spindle motor during a power-off sequence.

With the advent of hard disk drives of ever-decreasing physical size, the spindle motor has, itself, become greatly reduced in size. This reduction is size results in a greatly reduced amount of back-EMF being available to power head parking or unloading operations.

Typical 2.5 inch drives produce only about 300–500 mA of current for a time interval of approximately 2–5 seconds while the drive is spinning down during a power-down. This small amount of power, available for such a short period of time, makes the design of ramp loading and unloading mechanisms a very critical area of the overall disk drive.

OBJECTIVES OF THE INVENTION

A primary objective of the invention is to provide a unique configuration of ramps used for unloading the read/write heads from engagement with the disks at power loss that reduces the torque requirement of the actuator motor and thus reduces the power necessary to unload the heads.

It is a further objective of the invention to provide this low power unloading of the read/write heads using currently available materials and manufacturing methods.

SUMMARY OF THE INVENTION

The above-described objectives are attained in the present invention by providing "staggered" ramps, so that not all heads are being moved up the ramps simultaneously. By moving the read/write heads up the ramps in sequence, the overall power requirement for unloading the heads is reduced. This reduction in power requirement is critical in small disk drives having a small amount of back-EMF available at power loss.

DESCRIPTION OF THE DRAWINGS

The features and advantages of the invention may be best understood by referring to the accompanying drawings, wherein:

FIG. 6 is a table comparing the torque required to unload the heads using the ramp layout of the prior art to the torque requirement using the present invention for several different ramp angles and several different frictional values;

FIG. 7 is a table showing the reduction, as a percentage, achieved using the present invention for the ramp angles and frictional values of FIG. 6;

DETAILED DESCRIPTION OF THE INVENTION

Figure 1:
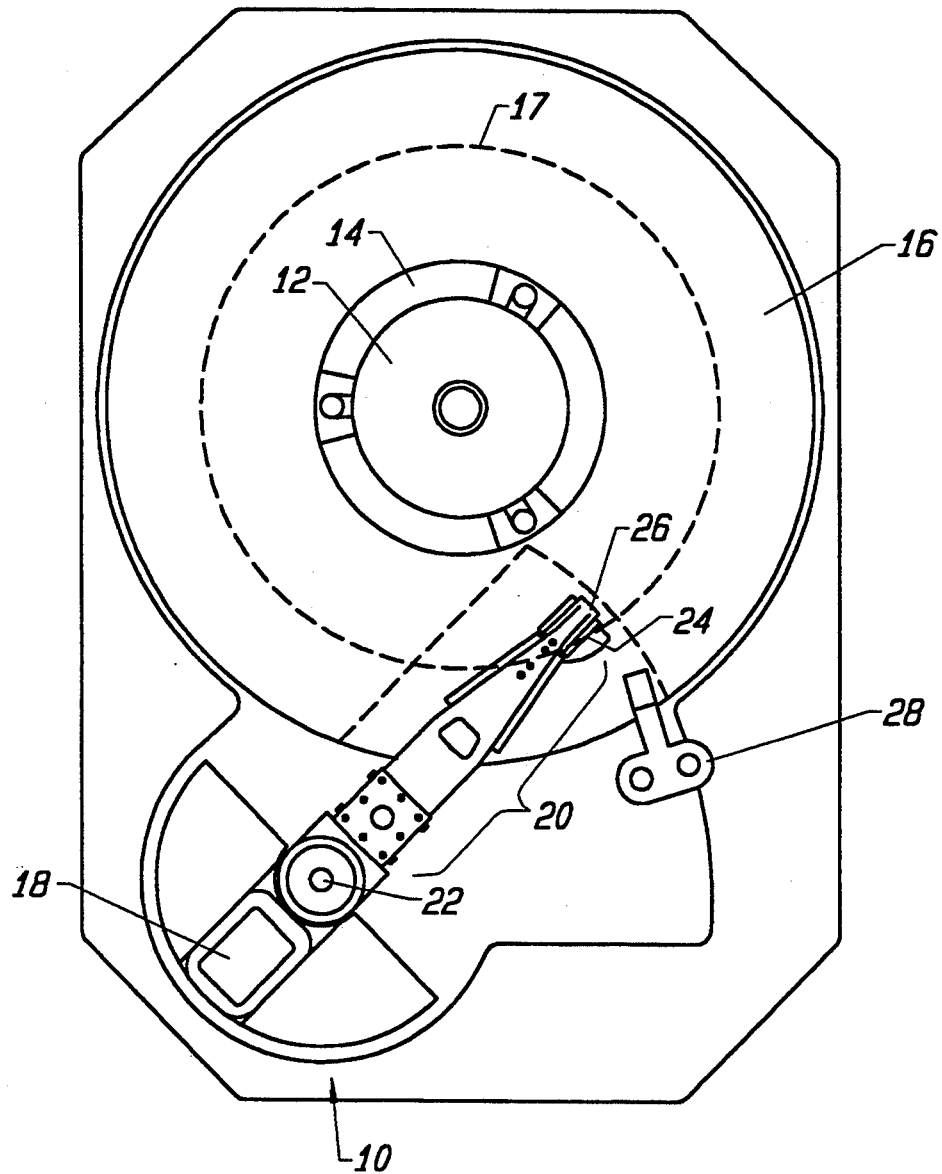
FIG. 1 is a plan view of a disk drive in which the invention is useful.

Referring first to FIG. 1, shown is a plan view of a disk drive in which the present invention is useful. The disk drive has a base casting 10 to which is mounted a spindle motor 12 having a shaft projecting upward through the casting 10 and mounting a hub 14 on which is mounted a plurality of disks 16 for rotation thereon. Each surface of the disks 16 contains a plurality of circular, concentric data tracks 17 on which data are recorded and from which data are retrieved. The processes of recording and retrieving data are usually referred to as writing and reading, respectively.

Also mounted to the base casting 10 is an actuator motor, shown generally as 18, which serves to rotate a plurality of head mounting arms 20 about a pivot 22. Attached to the head mounting arms 20 is a plurality of load beam/gimbal assemblies 24 at the distal ends of which are mounted a plurality of read/write heads 26. Under control of the drive electronics (not shown) the actuator motor 18 moves the read/write heads 26 to the desired data track for reading or writing.

Also shown at the outside edge of the disks 16 is an array of ramps 28 which slightly overlap the disks 16. When a loss of power is detected by the drive electronics, any active read/write operations are immediately terminated and the actuator motor 18 moves the read/write heads 26 in a clockwise direction toward the outside of the disks 16. When the read/write heads 26 approach the outside of the disks 16, specially adapted portions of the load beam/gimbal assemblies 24 contact the ramps 28 and lift the read/write heads off the disk surfaces.

In the embodiment of the invention to be discussed herein, we will assume a disk drive with two disks 16 and a total of four read/write heads 26, one head operating in cooperation with each disk surface.

Figure 2:
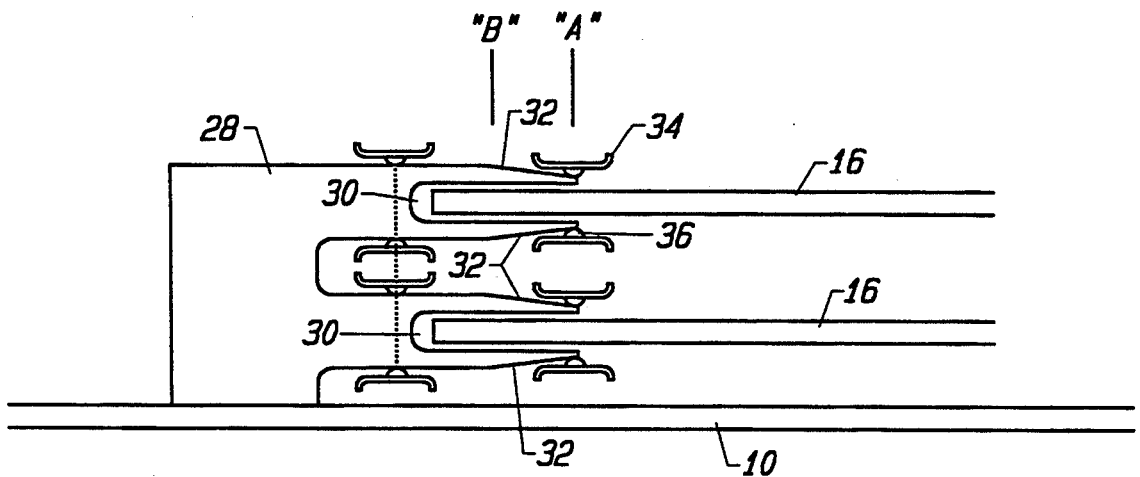
FIG. 2 is a side view of the ramp layout of the prior art, with sectional views of the load beam/gimbal assemblies that support the read/write heads and contact the ramps.

Referring to FIG. 2, shown is the arrangement of ramps typically used in the prior art. The base casting 10 supports and mounts the ramp assembly 28, which has notches 30 which accommodate the disks 16. There are four inclined ramp sections 32 which extend horizontally over the disk surfaces. The area of the disk 16 to the right of the line marked "A" is the location of the data storage tracks.

Also shown in FIG. 2 are cross-sectional views of the load beam/gimbal assemblies 34 which carry the read/write heads (not shown). Each of the load beam/gimbal assemblies 34 has a specially adapted portion 36 which provides a single contact point with the inclined ramp section 32. These load beam/gimbal assemblies 34 act as spring members to encourage the read/write heads into proximate engagement with the surfaces of the disks 16.

When a loss of power is detected, the load beam/gimbal assemblies 34 with their associated read/write heads are moved toward the outer edge of the disks 16 and the ramp assembly 28. When the load beam/gimbal assemblies 34 reach point "A", all of them make their first contact simultaneously with the inclined ram sections 32. As the arms carrying the load beam/gimbal assemblies continue to move to the left toward point "B" the specially adapted potions 36 of the load beam/gimbal assemblies 34 follow the inclined ram sections 32 and lift the attached read/write heads away from the surfaces of the disks 16. During the time the load beam/gimbal assemblies 34 are moving from point "A" to point "B", the actuator motor (not shown) is having to overcome not only the friction of contact between the load beam/gimbal assemblies 34 and the inclined portion of the ramps 32 but is also having to overcome the spring force of the load beam/gimbal assemblies 34 themselves. It is not until the load beam/gimbal assemblies 34 pass point "B", and the surfaces of the ramp assemblies again become horizontal and parallel to the surfaces of the disks 16 that this spring pressure becomes constant. In some designs, a latching mechanism is incorporated to lock the load beam/gimbal assemblies into this position.

Figure 3:
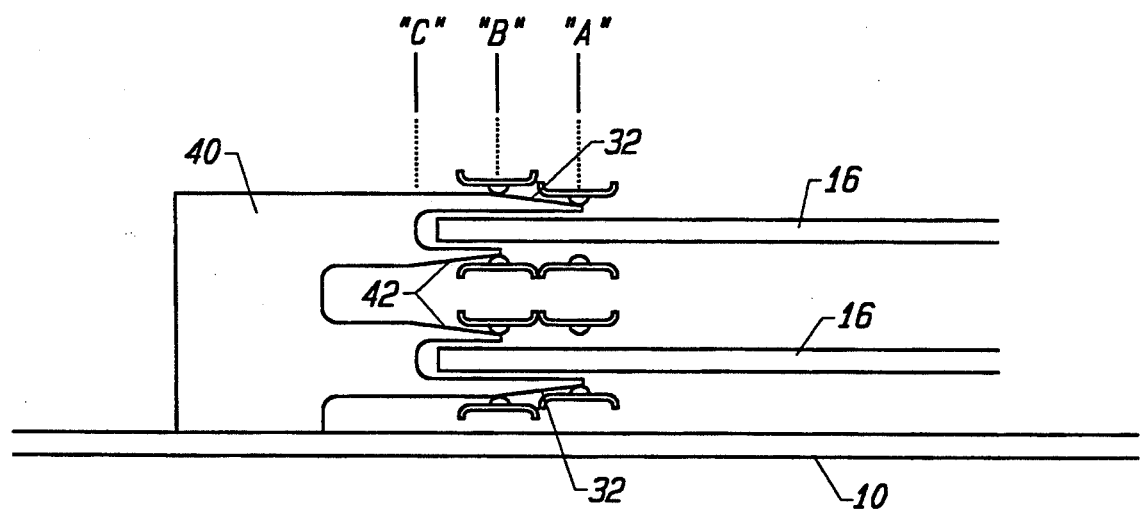
FIG. 3 is a side view of the ramp layout of one embodiment of the present invention, again with sectional views of the load beam/gimbal assemblies that support the read/write heads and contact the ramps.

Turning now to FIG. 3, shown is the improved ramp assembly 40 of the present invention, in association with the base casting 10 and the disks 16 as in FIG. 2.

The difference in the ramp assembly 40 becomes apparent if one examines the locations of the inclined ramp sections 32, 42. As can be seen, the top and bottom inclined ramp sections 32 are the same as in FIG. 2 and will contact the top and bottom load beam/gimbal assemblies at point "A" and ramp the read/write heads away from the top and bottom disk surfaces as the load beam/gimbal assemblies move between points "A" and "B". However, the two middle load beam/gimbal assemblies are not in contact with the ramp assembly 40 during this movement.

It is not until the load beam/gimbal assemblies reach point "B" that the two load beam/gimbal assemblies contact the second pair of inclined ramp sections 42. At this point, the top and bottom load beam/gimbal assemblies have reached the end of their associated inclined ramp sections 32 and begin moving once again in parallel with the disk surfaces.

As the load beam/gimbal assemblies move from point "B" to point "C" the middle two read/write heads move up the second pair of inclined ramp sections 42 and are lifted away from their associated disk surfaces, while the top and bottom load beam/gimbal assemblies continue to move in parallel with the disk surfaces.

Figure 4:
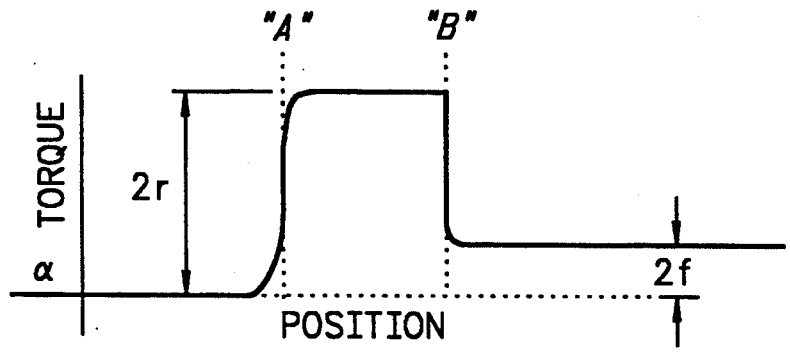
FIG. 4 is a graphic representation of the torque required to ramp unload read/write heads using the prior art approach of FIG. 2.
Figure 5:
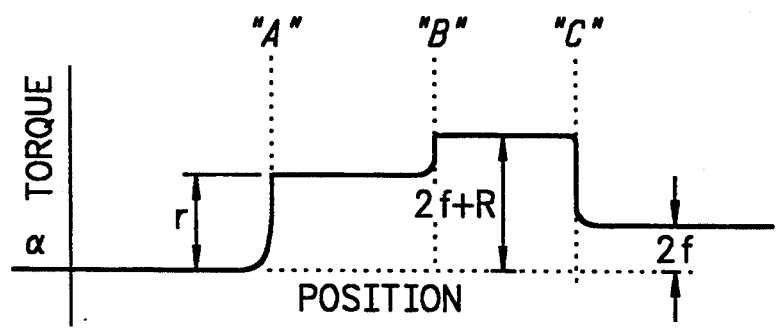
FIG. 5 is a graphic representation of the torque required to ramp unload read/write heads in accordance with the improved ramp configuration of FIG. 3.
Figure 8:
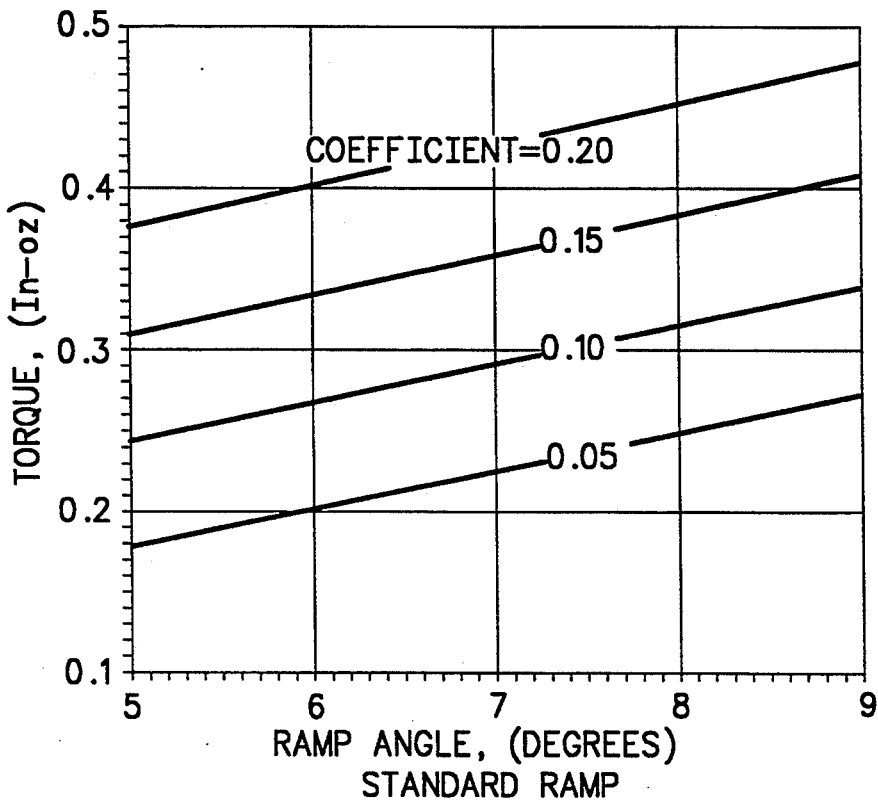
FIG. 8 is a graph showing the torque requirement for various ramp angles and frictional values when the prior art ramp layout is used.
Figure 9:
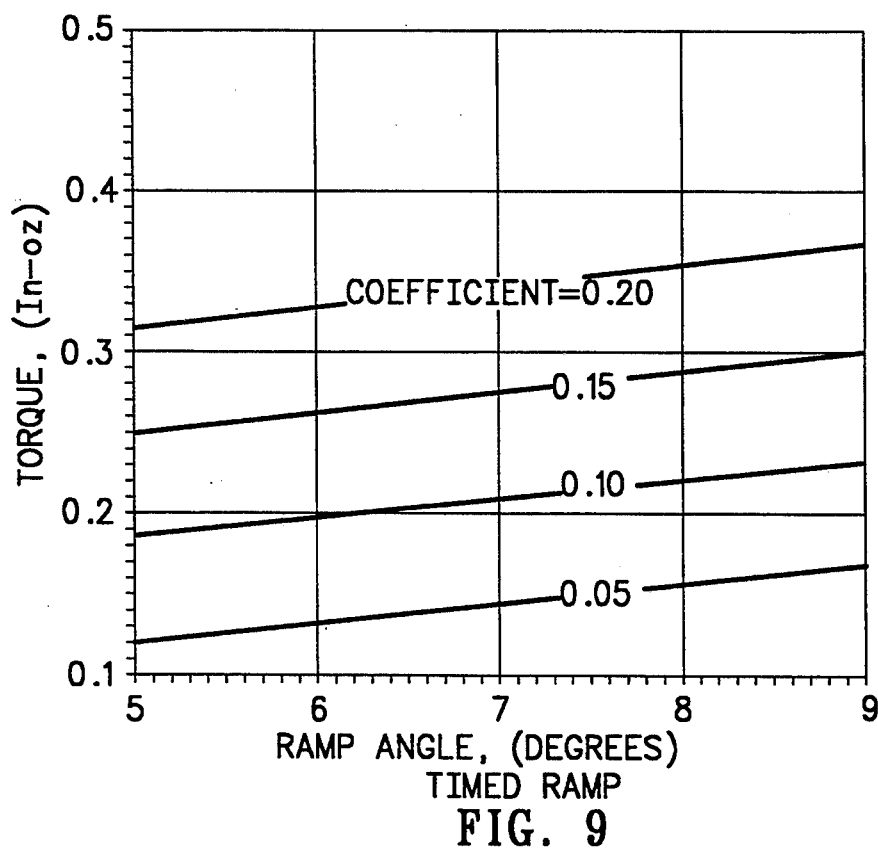
FIG. 9 is a graph of the same values as FIG. 8, but using the ramp layout of the present invention.

The savings in torque requirement can most easily be seen by referring to FIGS. 4 and 5.

In FIG. 4, a graph has been constructed to show the torque requirement of the prior art embodiment of FIG. 2. It is assumed that a baseline amount of torque a is required to move all four read/write heads when the heads are flying on the air bearing associated with each spinning disk (essentially no friction). Two other torque values are arbitrarily assigned:

r = the amount of torque necessary to move two heads in contact with inclined ramp surfaces of a given angle, and f = the amount of torque necessary to move two heads along a path parallel to the disk surface after the heads have been unloaded by the ramp.

As described in the discussion of FIG. 2, and shown in FIG. 4, the only torque required to move the load beam/gimbal assemblies toward the ramps is the baseline torque a. When the load beam/gimbal assemblies reach point "A", all four load beam/gimbal assemblies contact the ramps and start lifting the read/write heads away from their associated disk surfaces. This requires, by our definition, that a torque of $a+2r$ be applied as the load beam/gimbal assemblies move from point "A" to point "B". When the load beam/gimbal assemblies reach point "B" all four load beam/gimbal assemblies begin moving in parallel with the surfaces of the disk and the torque requirement drops to $a+2f$.

Referring now to FIG. 5, the same plot has been made using the improved ramp configuration of FIG. 3. Once again, the torque requirement before ramp contact is the baseline value $a$. In this instance, however, when the load beam/gimbal assemblies reach point "A" only two of the assemblies contact the inclined ramp sections while the other two assemblies continue to fly on the disks. This results in a torque requirement from point "A" to point "B" of only $a+r$.

At point "B", the top and bottom load beam/gimbal assemblies begin moving in parallel with the disk surfaces and the middle two load beam/gimbal assemblies contact the second pair of inclined ramp surfaces, resulting in a torque requirement during the time the load beam/gimbal assemblies move from point "B" to point "C" of $a+r+f$.

Finally, once the load beam/gimbal assemblies read point C", the torque requirement drops once again back to $a+2f$.

Calculations have been done to determine the effect of the present invention using various ramp angles and materials having various coefficients of friction. These calculations are summarized in FIG. 6. All calculations assume the two disk/four head configuration of the preceding examples.

As can be seen, the Table of FIG. 6 cross-references various ramp angles on the left against various coefficients of friction across the top. For each combination, two sets of torque requirements are given in both ounce-inches (oz-in) and Newton-meters (NM). The first of these values, labeled "STD", represents the torque requirement with the prior art ramp configuration of FIG. 2, and the second, labeled TIMED", represents the torque requirement using the improved ramp configuration of the present invention. As can clearly be seen, the "TIMED" values represent a significant reduction in torque—and therefore power—requirement.

Just how much of a savings is shown most clearly in FIG. 7, wherein the results of the table in FIG. 6 have been reduced to a percentage of reduction in torque requirement for each of the cases cited in FIG. 6. From the table in FIG. 7, it can be seen that torque requirement reductions of from 17% to 37% can be expected, which will allow the use of a smaller, more economical spindle motor to supply the power needed for the head unload operation.

Even though all of the examples cited represent a two-disk, four-head configuration, the concept of staggering the ramps is applicable to any multi-head design. For instance, in a single-disk, two-head arrangement, one read/write head could be ramped off the disk before the second, and in a three-disk, six-head disk drive, the heads could be divided into groups of two or three for ramping, with attendant reduction in the amount of torque needed to unload the heads.

Modifications to the present invention may become apparent to a person skilled in the art after studying this disclosure. Therefore, the scope of this invention is to be limited only by the following claims.

What is claimed is:

1. A ramp mechanism for use with a hard disk having upper and lower disk surfaces accessible by respective upper and lower read/write heads gimbal-mounted to respective upper and lower actuator arms comprising an actuator pair that move said heads in unison to access respective corresponding regions of said upper and lower disk surfaces, said hard disk rotating about a spindle axis during power-up condition and ceasing to rotate upon cessation of said power-up condition, a ramp mechanism causing said heads to be moved away from said surfaces of said hard disk upon cessation of said power-up condition, said ramp mechanism comprising:

a pair of spaced-apart first and second projecting members each having a disk-facing surface and a disk-nonfacing surface that has a parallel surface region to said and, in a region closest to said spindle axis, a ramp surface inclining from said parallel surface region toward said disk;

wherein said pair of projecting members is mounted such that at least a peripheral area of said hard disk is disposed between said disk-facing surfaces thereof, and wherein a chosen one of said pair of first and second projecting member projects further toward said spindle axis than does the unchosen projecting member comprising said pair; and wherein said upper and lower actuator arms are adapted to contact said respective disk-nonfacing surfaces of said pair of projecting members after cessation of said power-up condition, one of said actuator arms contacting the ramp surface of the further-projecting projecting member before the remaining actuator arm in said actuator pair contacts the ramp surface of the remaining projecting member in said pair of projecting members.

2. The ramp mechanism of claim 1, wherein said ramp surface and said parallel surface region on said disk-nonfacing surface of said further-projecting projecting member define an interface at a radial distance from said spindle axis, said distance substantially coinciding with the radial distance from said spindle axis of a closest portion of said ramp surface of said other projecting member of said pair of projecting members.

3. The ramp mechanism of claim 1, wherein at least one said ramp surface of a said projecting member defines an angle between 5.5° and 8.5° relative to a plane defined by said disk.

4. A hard disk drive unit, comprising:

a plurality of hard disks each having upper and lower disk surfaces, each said hard disk rotating about a spindle axis during power-up condition and ceasing to rotate upon cessation of said power-up condition;

an equal plurality of read/write head pairs for accessing, respectively, upper and lower surfaces of a corresponding said disk;

an equal plurality of actuator arm pairs, each bearing a corresponding one of said read/write head pairs and moving said heads in unison to access respective corresponding regions of said corresponding disks;

a ramp mechanism causing said heads to be moved away from said surfaces of said corresponding disks upon cessation of said power-up condition, said ramp mechanism including:

an equal plurality of spaced-apart first and second projecting member pairs, each said pair being associated with a corresponding said disk, with a corresponding said actuator arm pair, and with a corresponding said read/write head pair, each said projecting member in each said pair having, relative to the said associated corresponding disk a corresponding disk-facing surface and a corresponding disk-nonfacing surface that has a parallel surface region and, in a region closest to said spindle axis, a ramp surface inclining from said parallel surface region toward the corresponding said disk;

wherein each said projecting member pair is mounted such that at least a peripheral area of the corresponding said disk is disposed between said disk-facing surfaces thereof, and wherein for at least some of the projecting member pairs, a chosen one of said pair of first and second projecting members projects further toward said spindle axis than does the unchosen projecting member comprising said pair;

wherein each said upper and lower actuator arm pair is adapted to contact said respective disk-nonfacing surfaces of the corresponding said pair of projecting members after cessation of said power-up condition; and wherein in each actuator arm pair associated with said at least some of the projecting member pairs, a one of said actuator arms contacts the ramp surface of the corresponding further-projecting projecting member before the remaining actuator arm in the corresponding said actuator pair contacts the ramp surface of the remaining projecting member in said corresponding pair of projecting members.

5. The disk drive unit of claim 4, wherein for at least one pair of projecting members, said ramp surface and said parallel surface region on said disk-nonfacing surface of said further-projecting member define an interface at a radial distance from said spindle axis, said distance substantially coinciding with the radial distance from said spindle axis of a closest portion of said ramp surface of said other projecting member of said pair of projecting members.

6. The disk drive unit of claim 5, wherein said distances coincide for every said pair of projecting members.

7. The disk drive unit of claim 4, wherein at least one said ramp surface of a said projecting member defines an angle between 5.5° and 8.5° relative to a plane defined by the corresponding disk.

8. The ramp drive unit of claim 4, wherein each said ramp surface of a said projecting member defines an angle between 5.5° and 8.5° relative to a plane defined the corresponding disk.

9. The ramp drive of claim 4, wherein for each said projecting member pairs a chosen one of said pair of first and second projecting members projects further toward said spindle axis than does the unchosen projecting member comprising said pair.

* * * * *